(12) United States Patent
Nondahl et al.

(10) Patent No.: US 9,490,738 B2
(45) Date of Patent: Nov. 8, 2016

(54) SENSORLESS MOTOR DRIVE VECTOR CONTROL

(71) Applicant: Rockwell Automation Technologies, Inc., Mayfield Heights, OH (US)

(72) Inventors: Thomas A. Nondahl, Greenfield, WI (US); Jingbo Liu, Grafton, WI (US); Semyon Royak, Orange Village, OH (US); Peter B. Schmidt, Franklin, WI (US); Ehsan Al-Nabi, Cambridge (CA); Jingya Dai, Burnaby (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/053,273

(22) Filed: Feb. 25, 2016

(65) Prior Publication Data
US 2016/0173018 A1 Jun. 16, 2016

Related U.S. Application Data

(63) Continuation-in-part of application No. 14/555,769, filed on Nov. 28, 2014, now Pat. No. 9,294,019, which is a continuation of application No. 13/742,405, filed on Jan. 16, 2013, now Pat. No.
(Continued)

(51) Int. Cl.
*H02P 27/00* (2006.01)
*H02P 27/06* (2006.01)
(Continued)

(52) U.S. Cl.
CPC .............. *H02P 21/24* (2016.02); *H02M 1/126* (2013.01); *H02M 7/53873* (2013.01); *H02P 6/08* (2013.01); *H02P 6/28* (2016.02); *H02P 21/13* (2013.01);
(Continued)

(58) Field of Classification Search
CPC ........ H02P 21/06; H02P 27/06; H02M 1/126
USPC .......................................... 318/721, 801, 812
See application file for complete search history.

(56) References Cited

U.S. PATENT DOCUMENTS

| 3,723,840 A | 3/1973 | Opal et al. |
| 4,823,251 A | 4/1989 | Kawabata et al. |

(Continued)

FOREIGN PATENT DOCUMENTS

| CN | 2513286 Y | 9/2002 |
| CN | 101383585 A | 3/2009 |

(Continued)

OTHER PUBLICATIONS

"Guidelines for the Use of 400-600 Volt AC Drives in Medium Voltage Applications," Yaskawa Application Note, Jun. 7, 2005.
(Continued)

*Primary Examiner* — David S Luo
(74) *Attorney, Agent, or Firm* — Fay Sharpe LLP

(57) ABSTRACT

Disclosed examples include methods, computer readable mediums and motor drive power conversion systems for sensorless speed control of a motor driven by an inverter through an intervening filter, a transformer and a motor cable, in which sensorless vector control is used to regulate the motor speed based on a speed feedback value computed according to voltage or current values associated with the motor drive using an observer having formulas and impedance parameters of the filter, the transformer, the motor cable and the motor.

16 Claims, 14 Drawing Sheets

Related U.S. Application Data 9,124,209, and a continuation-in-part of application No. 14/666,894, filed on Mar. 24, 2015, now Pat. No. 9,312,779, which is a continuation of application No. 13/868,216, filed on Apr. 23, 2013, now Pat. No. 9,054,621, and a continuation-in-part of application No. 14/193,329, filed on Feb. 28, 2014, now Pat. No. 9,287,812, which is a continuation-in-part of application No. 13/931,839, filed on Jun. 29, 2013, now Pat. No. 9,054,611.

(60) Provisional application No. 62/212,063, filed on Aug. 31, 2015.

(51) Int. Cl.
*H02P 6/08* (2016.01)
*H02P 21/13* (2006.01)
*H02M 1/12* (2006.01)
*H02M 7/5387* (2007.01)
*H02M 1/00* (2006.01)

(52) U.S. Cl.
CPC ............... *H02P 21/18* (2016.02); *H02P 27/06* (2013.01); *H02M 2001/0009* (2013.01)

(56) References Cited

U.S. PATENT DOCUMENTS

| | | | |
|---|---|---|---|
| 5,032,771 A * | 7/1991 | Kerkman | H02P 21/09 318/52 |
| 5,526,252 A | 6/1996 | Erdman | |
| 5,703,449 A | 12/1997 | Nagate | |
| 5,717,305 A * | 2/1998 | Seibel | H02P 21/34 318/432 |
| 5,744,921 A | 4/1998 | Makaran | |
| 5,909,098 A | 6/1999 | Konecny et al. | |
| 5,959,431 A | 9/1999 | Xiang | |
| 5,994,869 A | 11/1999 | Bacerra | |
| 6,121,736 A | 9/2000 | Narazaki et al. | |
| 6,124,697 A | 9/2000 | Wilkerson | |
| 6,208,537 B1 | 3/2001 | Skibinski et al. | |
| 6,222,335 B1 | 4/2001 | Hiti et al. | |
| 6,329,781 B1 | 12/2001 | Matsui et al. | |
| 6,940,249 B2 | 9/2005 | Toyoda | |
| 6,965,212 B1 | 11/2005 | Wang et al. | |
| 7,045,988 B2 | 5/2006 | Ha et al. | |
| 7,049,778 B2 | 5/2006 | Katanaya | |
| 7,084,604 B2 | 8/2006 | Salomaki | |
| 7,102,323 B2 | 9/2006 | Zhou et al. | |
| 7,468,595 B2 * | 12/2008 | Lee | H02P 1/04 318/801 |
| 7,679,308 B2 | 3/2010 | Tomigashi | |
| 7,724,549 B2 | 5/2010 | Skibinski et al. | |
| 7,729,146 B2 | 6/2010 | Hayami et al. | |
| 7,932,693 B2 | 4/2011 | Lee | |
| 7,979,223 B2 | 7/2011 | Monti et al. | |
| 7,990,097 B2 | 8/2011 | Cheng et al. | |
| 8,009,450 B2 | 8/2011 | Royak et al. | |
| 8,143,838 B2 | 3/2012 | Akiyama | |
| 8,217,602 B2 | 7/2012 | Ikei | |
| 8,232,760 B2 * | 7/2012 | Lu | H02P 23/0077 318/798 |
| 8,288,886 B2 | 10/2012 | Anwar et al. | |
| 8,350,507 B2 | 1/2013 | Ito | |
| 8,541,971 B2 | 9/2013 | Sakai | |
| 8,736,220 B2 | 5/2014 | Ogawa et al. | |
| 8,890,450 B2 | 11/2014 | Maekawa | |
| 8,970,154 B2 | 3/2015 | Ishikawa et al. | |
| 8,981,702 B2 | 3/2015 | Katariya et al. | |
| 2004/0052097 A1 | 3/2004 | Morimoto | |
| 2006/0113952 A1 | 6/2006 | Zhou | |
| 2007/0001635 A1 | 1/2007 | Ho | |
| 2007/0007929 A1 | 1/2007 | Lee et al. | |
| 2008/0001571 A1 | 1/2008 | Tomigashi | |
| 2008/0074074 A1 | 3/2008 | Skibinski et al. | |
| 2008/0312855 A1 | 12/2008 | Monti et al. | |
| 2009/0146592 A1 | 6/2009 | Tobari et al. | |
| 2009/0153083 A1 | 6/2009 | Rozman | |
| 2011/0062908 A1 | 3/2011 | Kitanaka | |
| 2011/0109155 A1 | 5/2011 | Anwar et al. | |
| 2011/0181232 A1 | 7/2011 | Krishnamoorthy et al. | |
| 2012/0038300 A1 | 2/2012 | Kato et al. | |
| 2014/0197774 A1 | 7/2014 | Liu et al. | |
| 2014/0312811 A1 | 10/2014 | Liu et al. | |
| 2015/0002059 A1 | 1/2015 | Liu et al. | |
| 2015/0002067 A1 | 1/2015 | Rowan et al. | |

FOREIGN PATENT DOCUMENTS

| | | |
|---|---|---|
| CN | 201504207 U | 6/2010 |
| CN | 101950983 A | 1/2011 |
| CN | 102349230 A | 2/2012 |
| CN | 202872721 U | 4/2013 |
| CN | 103190068 A | 7/2013 |
| EP | 1635448 A1 | 3/2006 |
| JP | 2001-025282 | 1/2001 |
| JP | 2002034289 A | 1/2002 |
| WO | WO2009093214 A2 | 7/2009 |

OTHER PUBLICATIONS

Agarlita, Sorin-Cristian et al., "I-f Starting and Active Flux Based Sensorless Vector Control of Reluctance Synchronous Motors, with Experiments", 12$^{th}$ Int'l Conf. on Optimization of Electrical and Electronic Equipment, OPTIM 2010, pp. 337-342.

Andreescu, G., et al. "Stable V/f Control System with Unity Power Factor for PMSM Drives", IEEE 13$^{th}$ Int'l Conf. on Optimization of Electrical and Electronic Equipment (OPTIM), May 2012, pp. 432-438.

Batzel, Todd D. et al., "*Electric Propulsion With Sensorless Permanent Magnet Synchronous Motor: Implementation and Performance*", IEEE Transactions on Energy Conversion, vol. 20, No. 3, pp. 575-583, Sep. 2005.

Carpaneto, et al., "A New Sensorless Permanent Magnet Synchronous Motor Algorithm Based on Algebraic Method"; 13$^{th}$ European Conf. on Power Electronics and Applications, 2009; EPE 2009; Sep. 8-10, 2009, Barcelona, Spain; IEEE, Piscataway, NJ, Sep. 8, 2009, pp. 1-10.

Colby, Roy S., "An Efficiency-Optimizing Permanent-Magnet Synchronous Motor Drive", IEEE Transactions on Industry Applications, vol. 24, No. 3, May/Jun. 1998, pp. 462-469.

Fatu et al., I-F Starting Method With Smooth Transition to EMF Based Motion-Sensorless Vector Control of PM Synchronous Motor/Generator, 2008, IEEE, pp. 1481-1487.

Halkassari, Optimal U/F-Control of High Speed Permanent Magnet Motors, 2006, IEEE, pp. 2302-2308.

Iepure, Liviu Ioan et al., "Hybrid I-f Starting and Observer-Based Sensorless Control of Single-Phase BLDC-PM Motor Drives", IEEE Transactions on Industrial Electronics, vol. 59, No. 9, Sep. 2012, pp. 3436-3444.

J. Liu et al., "Rotor Position Estimation for Synchronous Machines Based on Equivalent EMF", IEEE Transactions on Industry Applications, vol. 47, pp. 1310-1318, May-Jun. 2011.

Jaitrong et al., "A Modify Technique to Actively Damp Oscillation in the Input LC Filter of Three-Phase PWM Rectifier", Electrical Engineering/Electronics, Computer, Telecommunications and Information Technology, 2008; Proceedings of ECTI-CON 2008; pp. 1017-1020.

Kim et al., "PWM Switching Frequency Signal Injection Sensorless Methods in IPMSM", IEEE, 2011, pp. 3021-3028.

Kiuchi, M., et al., "V/f Control of Permanent Magnet Synchronous Motors Suitable for Home Appliances by DC-link Peak Current Control Method", The Jun. 2010 Int'l Power Electronics Conference, IEEE 2010, pp. 567-573.

Kobayashi et al., "Investigation of IPMSM's Position Estimation in Low Speed Region with DC Link Current Detection", IEEE Jan. 2007, pp. 1411-1416.

(56) References Cited

OTHER PUBLICATIONS

Kojima, Mari et al., "*Novel Vector Control System Using Deadbeat-Controlled PWM Inverter With Output LC Filter*", IEEE Transactions on Industry Applications, vol. 40, No. 1, pp. 162-169, Jan./Feb. 2004.

Kubota et al., "Sensorless Vector Control of Closed-Slot Induction Machines at Low Frequency", IEEJ Journal of Industry Applications, vol. 2, No. 1, The Institute of Electrical Engineers of Japan, 2013, pp. 74-78.

Kukrer, "Deadbeat Control of a Three-Phase Inverter with an Output LC Filter", IEEE Transactions on Power Electronics, vol. 11, No. 1, Jan. 1996, 8 pgs.

Laczynski et al., "Active Damping of LC-Filters for High Power Drives Using Synchronous Optimal Pulsewidth Modulation", Power Electronics Specialists Conf., IEEE, Jun. 15, 2008, pp. 1033-1040.

Loh, Poh Chiang et al., "*Analysis of Multiloop Control Strategies for LC/CL/LCL-Filtered Voltage-Source and Current-Source Inverters*", IEEE Transactions on Industry Applications, vol. 41, No. 2, pp. 644-654, Mar./Apr. 2005.

Makridenko, L.A. et al., "Sensorless Drive With Synchronous Machine and Submersible Inverter for Oil-Drowned Pump", IEEE European Conf. on Power Electronics and Applications (EPE), pp. 1-10, Sep. 2009.

Matsushita, M., et al., "Stabilization Control of Sensorless Sinusoidal Wave Drive for Control of Power Factor of PM Motor", IEEE Int'l Conf. Electrical Machines and Systems (ICEMS), 2009, 5 pgs.

Miranda et al., "Parameter and Speed Estimation for Implementing Low Speed Sensorless PMSM Drive System Based on an Algebraic Method"; Applied Power Electronics Conf.; APEC 2007, 22$^{nd}$ Annual IEEE; Feb. 1, 2007,;pp. 1406-1410.

Miranda et al., "Sensorless Control of a PMSM Synchronous Motor at Low Speed"; IEEE Industrial Electronics; IECON 2006; 32$^{nd}$ Annual Conf., IEEE; Piscataway, NJ; Nov. 1, 2006; pp. 5069-5074.

Moldovan et al., "Active-Flux Based, V/f-With-Stabilizing-Loops Versus Sensorless Vector Control of IPMSM Drives"; Industrial Electronics (ISIE); 2011 IEEE Int'l Symposium; Jun. 27, 2011; pp. 514-519.

Mukherjee et al., "Fast Control of Filter for Sensorless Vector Control SQIM Drive With Sinusoidal Motor Voltage", IEEE Transactions on Industrial Electronics, vol. 54, No. 5, Oct. 2007, pp. 2435-2442.

Nakamura, Yoshinobu et al., "High-Efficiency Drive Due to Power Factor Control of a Permanent Magnet Synchronous Motor", IEEE Transactions on Power Electronics, vol. 10, No. 2, Mar. 1995, revised Sep. 13, 1994, pp. 247-253.

Park et al., "Analysis and Reduction of Time Harmonic Rotor Loss in Solid-Rotor Synchronous Reluctance Drive", IEEE Transactions on Power Electronics, vol. 23, No. 2, Mar. 1, 2008, pp. 985-992.

Park et al., "Design and Control of High-Speed Solid-Rotor Synchronous Reluctance Drive With Three-Phase LC Filter", Conference Record of the 2005 IEEE Industry Applications Conf. 40$^{th}$ IAS Annual Meeting, vol. 1, Oct. 2, 2005, pp. 715-722.

Perera, P.D. Chandana, "A Sensorless, Stable V/f Control Method for Permanent-Magnet Synchronous Motor Drives", IEEE Transactions on Industry Applications, vol. 39, No. 3, May/Jun. 2003, IEEE 2003, pp. 783-791.

Ryvkin, S. et al., "Sensorless Oil Drowned Pump Drive", IEEE ISIE 2005, Jun. 20-23, 2005, Dubrovnik, Croatia, pp. 963-968.

Salomäki, J. et al., "*Sensorless Control of Induction Motor Drives Equipped With Inverter Output Filter*", IEEE Transactions on Industrial Electronics, vol. 53, No. 4, pp. 1188-1197, Aug. 2006.

Salomäki, J. et al., "*Sensorless Vector Control of PMSM Drives Equipped With Inverter Output Filter*", In Proceedings of the 32$^{nd}$ Annual Conference of the IEEE Industrial Electronics Society (IECON 2006), Paris, France, pp. 1059-1064.

Steinke et al., "Use of a LC Filter to Achieve a Motorfriendly Performance of the PWM Voltage Source Inverter", Electric Machines and Drives Conference Record, 1997; IEEE, Milwaukee, WI, May 18, 1997, 3 pgs.

Stirban et al., "Motion-Sensorless Control of BLDC-PM Motor With Offline FEM-Information-Assisted Position and Speed Observer"; IEEE Transactions on Industry Applications; IEEE Service Center, Piscataway, NJ; vol. 48, No. 6; Nov. 1, 2012; pp. 1950-1958.

Yaskawa Technical Review, vol. 69, No. 2, AC Drive Drive, Sensorless Drive Technology for Permanent Magnet Synchronous Motor; http://www.yaskawa.co.jp/en/technology/tech_news/69-2/t10.htm, retrieved from the Internet Nov. 26-Feb. 2014, 1 pg.

Yim et al., "A Predictive Current Control Associated to EKF for High Performance IPMSM Drives"; Applied Power Electronics Conf. and Exposition (APEC), 2011; 26$^{th}$ Annual IEEE, Mar. 6, 2011; pp. 1010-1016.

Stirban et al., "Motion-Sensorless Control of BLDC-PM Motor With Offline FEM Information Assisted State Observer"; Optimization of Electrical and Electronic Equipment (OPTIM), 2010 12$^{th}$ International Conference, Ma 22, 2010, pp. 321-328.

\* cited by examiner

SENSORLESS MOTOR DRIVE VECTOR CONTROL

REFERENCE TO RELATED APPLICATIONS

This application claims, under 35 USC §119, priority to, and the benefit of U.S. Provisional Application Ser. No. 62/212,063, filed on Aug. 31, 2015 and entitled CONTROL OF MOTOR DRIVES WITH OUTPUT SINE WAVE FILTER CAPACITOR CURRENT, the entirety of which application is hereby incorporated by reference.

This application is a continuation-in-part of, and claims priority to and the benefit of, U.S. patent application Ser. No. 14/555,769, filed on Nov. 28, 2014, entitled METHOD AND APPARATUS FOR CONTROLLING POWER CONVERTER WITH INVERTER OUTPUT FILTER, which is a continuation of U.S. patent application Ser. No. 13/742,405, filed on Jan. 16, 2013, entitled METHOD AND APPARATUS FOR CONTROLLING POWER CONVERTER WITH INVERTER OUTPUT FILTER and granted on Sep. 1, 2015 as U.S. Pat. No. 9,124,209 to Liu et al., the entireties of which applications and granted patent are hereby incorporated by reference.

This application is a continuation-in-part of, and claims priority to and the benefit of, U.S. patent application Ser. No. 14/666,894, filed on Mar. 24, 2015, entitled POSITION SENSORLESS OPEN LOOP CONTROL FOR MOTOR DRIVES WITH OUTPUT FILTER AND TRANSFORMER, which is a continuation of U.S. patent application Ser. No. 13/868,216, filed on Apr. 23, 2013, entitled POSITION SENSORLESS OPEN LOOP CONTROL FOR MOTOR DRIVES WITH OUTPUT FILTER AND TRANSFORMER and granted on Jun. 9, 2015 as U.S. Pat. No. 9,054,621 to Liu et al., the entireties of which applications and granted patent are hereby incorporated by reference.

This application is a continuation-in-part of, and claims priority to and the benefit of, U.S. patent application Ser. No. 14/193,329, filed on Feb. 28, 2014, entitled METHOD AND APPARATUS FOR STABILITY CONTROL OF OPEN LOOP MOTOR DRIVE OPERATION, which is a continuation-in-part of U.S. patent application Ser. No. 13/931,839, filed on Jun. 29, 2013, entitled METHOD AND APPARATUS FOR STABILITY CONTROL OF OPEN LOOP MOTOR DRIVE OPERATION and granted on Jun. 9, 2015 as U.S. Pat. No. 9,054,611 to Liu et al., the entireties of which applications and granted patent are hereby incorporated by reference.

INCORPORATION BY REFERENCE

U.S. patent application Ser. No. 14/565,781 filed Dec. 10, 2014 to Nondahl et al., entitled TRANSITION SCHEME FOR POSITION SENSORLESS CONTROL OF AC MOTOR DRIVES is hereby incorporated by reference in its entirety.

BACKGROUND INFORMATION

The subject matter disclosed herein relates to power conversion, and more specifically to sensorless vector speed control to drive a motor.

BRIEF DESCRIPTION

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides power conversion systems and methods to drive a motor load. Disclosed examples include methods, computer readable mediums and motor drives power conversion systems for sensorless speed control of a motor driven by an inverter through an intervening filter, a transformer and a motor cable, in which sensorless vector control is used to regulate the motor speed based on a speed feedback value computed according to voltage or current values associated with the motor drive using an observer having formulas and impedance parameters of the filter, the transformer, the motor cable and the motor.

DETAILED DESCRIPTION

Figure 1:
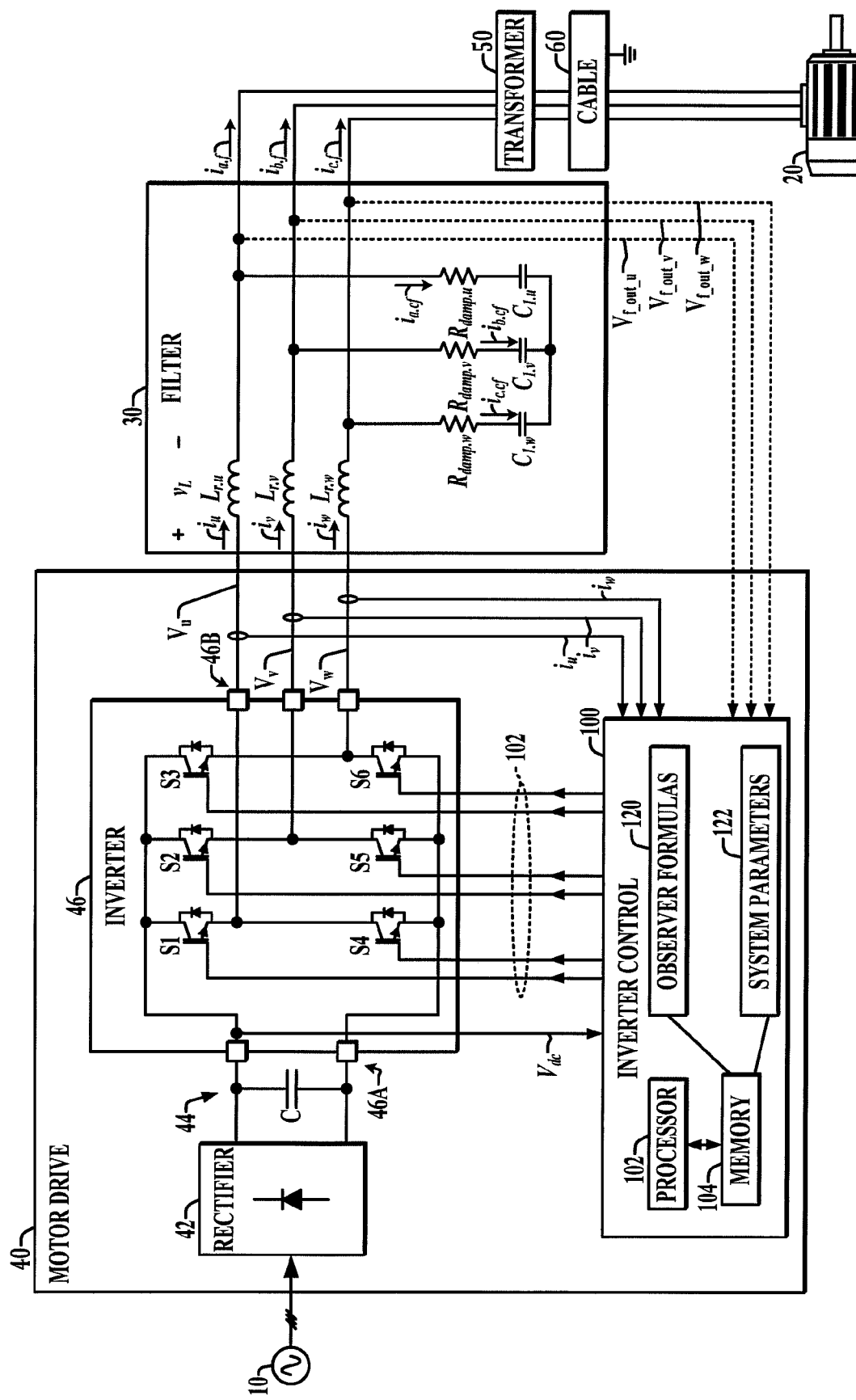
FIG. 1 is a schematic diagram of a motor drive power conversion system with an inverter driving a motor load through an output filter and a transformer.

Referring now to the figures, several embodiments or implementations are hereinafter described in conjunction with the drawings, wherein like reference numerals are used to refer to like elements throughout, and wherein the various features are not necessarily drawn to scale.

FIG. 1 shows a motor drive power conversion system 40, including an inverter 46 to drive an output load, such as a motor 20 through an intervening filter 30, referred to herein as an output filter or a sine wave filter, and a motor cable 60. In certain implementations, as shown in FIG. 1, a transformer 50 can be connected between the output filter 30 and the driven motor load 20. Power conversion systems typically include an inverter stage to generate and provide AC output power to a load, such as a single or multi-phase AC motor. Pulse width modulated (PWM) output inverters provide output currents and voltages that include a number of pulses. Accordingly, output filters, such as sine wave filters are sometimes employed between the inverter output and the driven load to reduce the high frequency content caused by pulse width modulation of the inverter switches.

Disclosed examples include methods, computer readable mediums 104 and motor drives power conversion systems 40 for sensorless speed control of a motor 20 driven by an inverter 46 through the intervening filter 30, transformer 50 and a motor cable 60, in which sensorless vector control is used to regulate the motor speed based on a speed feedback value spfbk computed according to voltage or current values associated with the motor drive 40 using an observer 211 having formulas 120 and impedance parameters 122 of the filter 30, the transformer 50, the motor cable 60 and the motor 20. In one example, the impedance parameters 122 are referred to a primary side of the transformer 50. In another example, the impedance parameters 122 are referred to a secondary side of the transformer 50. The presence of the output filter 30 between the power conversion system 40 and the load 20 makes accurate control of the motor voltages and currents more difficult, as the power delivered to the load 20 is different from that delivered to the input of the filter 30. The output inverter stage 46 may be controlled according to feedback signals measured at the inverter output terminals, but these feedback values generally do not represent the currents or voltages ultimately provided to the load 20. Feedback sensors can be provided at the load itself for direct measurement of the load parameters, but this increases system cost, and may not be possible in all applications.

The system 40 can be used in a variety of applications, particularly where providing position and/or speed sensors directly at a motor load 20 is difficult or impractical. In certain applications, a step-up transformer 50 is used to boost the motor drive output voltage, allowing use of a low-voltage drive to power a medium voltage induction motor 20, and/or to reduce $I^2R$ losses and facilitate use of a smaller diameter cable wire 60 for long cable runs between the motor drive 40 and the driven motor 20. Certain applications also employ output filters 30 between the motor drive inverter output and the transformer primary in order to suppress reflected wave voltage spikes associated with pulse width modulated (PWM) operation of variable frequency drives 40. Use of sensorless voltage-frequency control techniques, however, has previously been problematic, particularly where a transformer and/or sine wave filter is connected between the motor drive and the motor load. Sensorless field-oriented-control (FOC) or other open loop speed control techniques have thus been found generally unsuitable for low-speed motor drive operation where output filters and transformers are used, such as in electric submersible pumps (ESPs), and these difficulties are particularly problematic in driving permanent magnet synchronous motors (PMSMs). Moreover, motors in sensorless speed control applications also suffer from oscillation in rotor velocity about the setpoint speed following load transitions or speed setpoint adjustments, particularly at low speeds. In certain situations, moreover, starting the driven motor from a stopped condition may be difficult due to unstable motor speed oscillations.

Presently disclosed embodiments provide power conversion systems 40 and inverter control methods and apparatus 100 to drive a motor load 20 through an intervening filter 30, which can also be used in combination with a transformer 50 and a potentially lengthy cables 60 coupled between the filter output and the driven motor load 20. FIG. 1 shows a motor drive power conversion system 40 with an inverter 46 and an inverter controller 100 configured to control current of a driven motor load 20 based on sensed or computed inverter output current signals or values $i_u$, $i_v$, $i_w$ representing output currents flowing at an AC output 46B of the inverter 46. The motor drive 40 receives single or multiphase AC input power from a power source 10 and converts this to a DC bus voltage using a rectifier 42 which provides a DC output voltage to a DC link circuit 44 having a capacitor C. The rectifier 42 can be a passive rectifier including one or more diode rectifier components, or may be an active front end (APE) system with one or more rectifier switching devices (e.g., IGBTs, SiC transistors, IGCTs, etc.) and an associated rectifier controller (not shown) for converting input AC electrical power to provide the DC bus voltage in the link circuit 44. Other configurations are possible in which the drive 40 receives input DC power from an external source (not shown) to provide an input to the inverter 46, in which case the rectifier 42 may be omitted. The DC link circuit 44 may include a single capacitor C or multiple capacitors connected in any suitable series, parallel and/or series/parallel configuration to provide a DC link capacitance across inverter input terminals 46A. In addition, while the illustrated motor drive 40 is a voltage source converter configuration including one or more capacitive storage elements in the DC link circuit 44, the various concepts of the present disclosure may be implemented in association with current source converter architectures in which a DC link circuit 44 includes one or more inductive storage elements, such as one or more series-connected inductors situated between the source of DC power (e.g., rectifier 42 or external DC source) and the input 46A of the inverter 46. In other possible implementations, the motor drive 40 includes a direct DC input to receive input power from an external source (not shown), and in certain embodiments the rectifier 42 and DC link circuit 44 may both be omitted.

The DC input 46A of the inverter 46 includes first and second (e.g., plus and minus) terminals connected to the DC link circuit 44, as well as a plurality of switching devices S1-S6 coupled between the DC input 46A and the motor drive AC output 46B. In operation, the inverter switching devices S1-S6 are actuated by inverter switching control signals 102 provided by the controller 100 to convert DC electrical power received at the DC input 46A to provide AC electrical output power as inverter output voltages $V_u$, $V_v$, and $V_w$ and inverter output currents $i_u$, $i_v$, and $i_w$ at the AC output 46B. The filter circuit 30 receives the AC output from the inverter 46 of the motor drive 40. The motor drive 40 can be employed in connection with permanent magnet synchronous motors 20, or other types of AC motor loads 20 such as medium voltage induction motors 20, for example.

One or more feedback signals or values may be provided from the motor 20 itself, including a motor (e.g., rotor) position or angle signal Theta and a motor speed or velocity signal Spfbk, although not a strict requirement of all embodiments of the present disclosure. Moreover, the concepts of the present disclosure advantageously facilitate sensorless speed estimation and vector control-based speed regulation by the inverter controller 100, and thus direct feedback from the driven motor load 20 is not required in all implementations. The motor drive 40 in certain embodiments implements a motor speed and/or position and/or torque control scheme in which the inverter controller 100 selectively provides the switching control signals 102 in a closed and/or open-loop fashion according to one or more setpoint values such as a motor speed setpoint Spref, which can be a signal or value generated by the controller 100, or a fixed setpoint value, or such setpoint value can be received from an external system (not shown). In practice, the motor drive 40 may also receive a torque setpoint and/or a position (e.g., angle) setpoint, and such desired signals or values (setpoint(s)) may be received from a user interface and/or from an external device such as a distributed control system, etc. (not shown). As used herein, a signal can be an analog signal, such as a current or a voltage signal, or a signal can include digital values generated or consumed by the processor 102.

In the example of FIG. 1, the inverter 46 is connected to the load 20 through the intervening filter circuit 30. In one example, the filter 30 is an "L-C" configuration in which each of the power converter output lines is connected to the motor through a series-connected filter inductor $L_r$ ($L_{r,u}$, $L_{r,v}$ and $L_{r.w}$ in the illustrated example), with a corresponding filter capacitor $C_1$ connected between the corresponding motor line and a common connection point (a neutral of a Y-connected set of filter capacitors $C_{1.u}$, $C_{1.v}$ and $C_{1.w}$ in the illustrated example). In the example of FIG. 1, moreover, the damping resistors $R_{damp.u}$, $R_{damp.v}$ and $R_{damp.w}$ are connected in series with the filter capacitors $C_1$. The damping resistors can be omitted in certain embodiments. Other implementations are possible in which the filter capacitors $C_1$ are connected in a "Delta" configuration. In the illustrated (Y-connected) configuration, the filter circuit neutral point can be optionally connected to a circuit ground or other common connection point associated with the motor drive 40, although not a strict requirement of the present disclosure. The disclosed apparatus and techniques can be employed in connection with other forms and types of filter circuits 30, including without limitation L-C-L circuits, etc.

The output of the filter circuit 30 provides phase currents $i_{a.f}$, $i_{b.f}$ and $i_{c.f}$ to control the motor load 20 (e.g., through the intervening transformer 50 and cable 60). However, the filter capacitor currents $i_{a.cf}$, $i_{b.cf}$ and $i_{c.cf}$ flow in the filter capacitors $C_f$ and non-zero filter voltages $v_L$ may develop across one or more of the filter inductors $L_f$. Simple closed-loop control based on measured inverter output current signals or values $i_u$, $i_v$, $i_w$ may thus result in less than optimal operation of the driven load 20. Directly measuring the filter output currents $i_{a.f}$, $i_{b.f}$, $i_{c.f}$ and/or motor currents $I_{m.a}$, $I_{m.b}$, $I_{m.c}$ and/or motor voltages, however, would require additional hardware and cabling, and may not be economically feasible or technically possible in certain applications. Nevertheless, for those cases where motor and/or filter output currents and/or drive output voltages such as $V_u$, $V_v$, $V_w$, and/or filter output voltages such as $V_a$, $V_b$, and $V_c$ in FIG. 1, are measured, those signals can be used to enhance or replace the inverter current and/or voltage signals in the control operation of the drive 40.

Certain embodiments of the inverter controller 100, however, advantageously provide sensorless vector control using a back-EMF based observer 211 to estimate the rotor position and/or speed of the driven motor load 20 using observer formulas and system parameters via computer executable instructions stored in a computer-readable electronic memory 104, which are executed by a processor 102 to implement vector control to regulate the motor speed. In addition, the controller 100 computes inverter-referred (i.e, as seen from the motor drive 40) motor current feedback values $i_{a.m}$, $i_{b.m}$, $i_{c.m}$ according to inverter output current values $i_u$, $i_v$, $i_w$, capacitance values representing capacitances of filter capacitors $C_f$ of the filter 30, filter output voltage values $V_{ab}$, $V_{bc}$, $V_{ca}$ representing output voltages of the filter 30, and either a speed feedback value Spfbk or a speed reference value Spref of a previous control cycle representing the electrical operating frequency of the inverter 46. The controller 100 computes 508 a speed feedback value Spfbk for the current control cycle according to the inverter-referred motor current values $i_{a.m}$, $i_{b.m}$, $i_{c.m}$ and the filter output voltage values $V_{ab}$, $V_{bc}$, $V_{ca}$, and controls 518 the inverter 46 to regulate the rotational speed of the motor 20 at least partially according to the speed feedback value Spfbk using vector control.

In various implementations, as seen in FIGS. 4-14 below, the controller 100 and the observer 211 thereof can perform the speed regulation and/or position/speed estimation functions according to one or more voltage and/or current values associated with the motor drive system 40, which can be measured values at the inverter output, at the output of the filter 30, at the output (e.g., secondary) of the transformer 50 or combinations thereof, in conjunction with observer system parameters 122 that are representative of impedance parameters of the filter 30, the transformer 50, the motor cable 60 and the motor 20 referred to the primary side or to the secondary side of the transformer 50 in order to facilitate reliable, stable speed control of the driven motor 20. For example, as seen in FIG. 1, the illustrated drive 40 may include one or more current sensors configured to measure, sense, or otherwise detect at least one inverter output feedback signal or value (e.g., output currents $i_u$, $i_v$, $i_w$) which represent the output current at the AC output 46B of the inverter 46. The inverter controller 100 thus accommodates the presence of the filter circuit 30 (e.g., and any optionally included transformer 50 and potentially lengthy motor cable 60) between the motor drive output 46B and the driven motor load 20, without requiring addition of external sensors to sense the actual rotor speed and/or position conditions at the motor load 20.

The controller 100 and the components thereof may be any suitable hardware, processor-executed software, processor-executed firmware, logic, or combinations thereof that are adapted, programmed, or otherwise configured to implement the functions illustrated and described herein. The controller 100 in certain embodiments may be implemented, in whole or in part, as software components executed using one or more processing elements, such as one or more processors 102, and may be implemented as a set of subcomponents or objects including computer executable instructions stored in the non-transitory computer readable electronic memory 104 for operation using computer readable data executing on one or more hardware platforms such as one or more computers including one or more processors, data stores, memory, etc. The components of the controller 100 may be executed on the same computer processor or in distributed fashion in two or more processing components that are operatively coupled with one another to provide the functionality and operation described herein.

Figure 2:
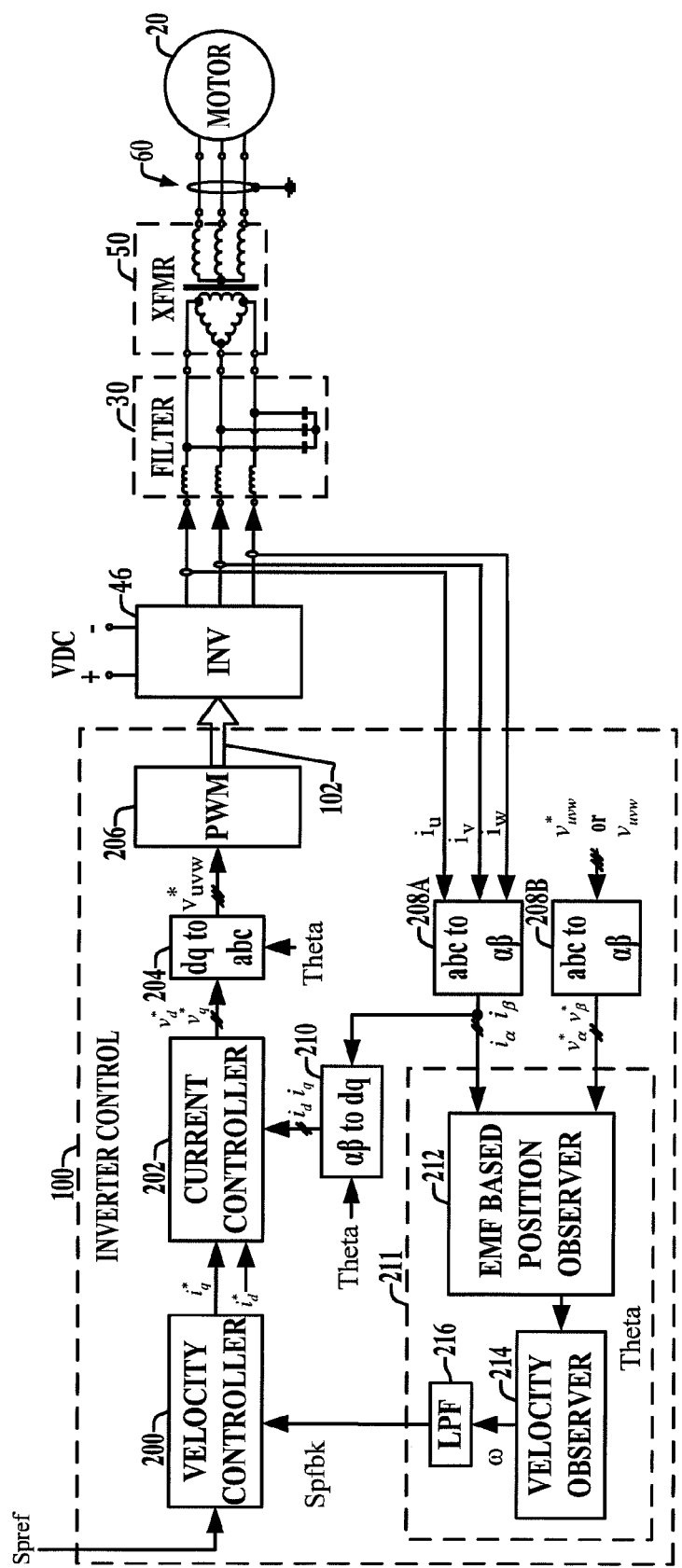
FIG. 2 is a schematic diagram showing further details of an EMF-based observer implemented in an inverter controller in the system of FIG. 1.
Figure 3:
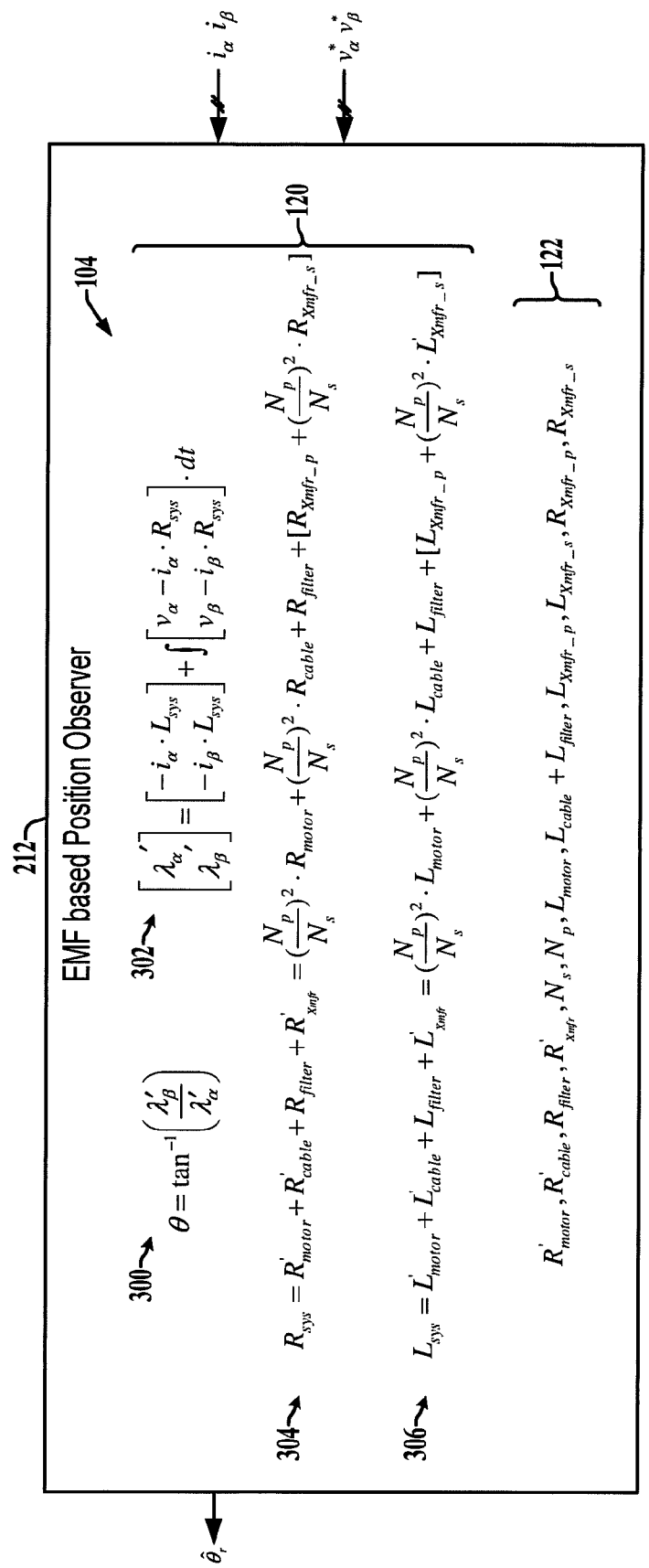
FIG. 3 is a schematic diagram illustrating further details of example observer formulas and system parameters in the observer of FIG. 2.

Referring also to FIGS. 2 and 3, the controller 100 in one example is configured by execution in the processor 102 of instructions in the memory 104 to implement the control configuration illustrated in FIG. 2. The inverter control component 100 in one example includes or implements a velocity controller 200 implementing a speed or velocity control loop, a current controller 202 implementing an inner current and/or torque control loop, a DC two-axis reference frame to three axis reference frame converter component 204 (dq to abc converter receiving DC d and q axis values) that also receives an angle input Theta. A PWM component 206 generates pulse width modulated switching control signals 102 in order to operate the switches of the inverter 46. In this example, the velocity controller 200 receives a speed setpoint or reference value Spref and a speed feedback signal Spfbk is received from the observer 211, and the velocity controller 200 provides a q-axis current reference signal or value $i^*_q$ as an input to the current controller 202. The current controller 202 also receives a d-axis current reference signal $i^*_d$ as well as current feedback signals or values $i_d$ and $i_q$, and provides d and q axis voltage reference values $v^*_d$ and $v^*_q$ to the converter component 204. The converter component 204 provides three-axis voltage reference signals or values $v^*_{uvw}$ to the PWM component according to the estimated rotor EMF angular position Theta.

The controller 100 also receives one or more current values and/or one or more voltage values associated with the power converter system 40. In the example of FIG. 2, inverter output currents $i_u$, $i_v$, and $i_w$ are measured and provided to a three-axis to two-axis converter component 208 and/or inverter output voltage feedback values $v_u$, $v_v$ and $v_w$ or the voltage command or reference values $v^*_{uvw}$ are provided to a converter component 208, where the converter component or components 208 receive three-axis values in an "a, b, c" reference frame and provide two-axis signals or values in an AC "α, β" reference frame for use in estimating the angular position of the EMF (the motor terminal voltages generated by motion of the rotor magnets) of the driven motor 20 and/or the rotor speed of the driven motor 20. The converted α, β current values $i_\alpha$ and $i_\beta$ are provided to an α, β to d, q converter component 210 which provides the current feedback signals or values $i_d$ and $i_q$ to the current controller 202 to implement a current control loop in the inverter controller 100, and these values are also provided to an EMF based position observer 212 implemented in one example of the speed observer 211. In addition, the position observer 212 in one example receives α, β reference frame voltage signals or values $v_\alpha$ and $v_\beta$ from the other converter component 208. The position observer provides the rotor EMF angular position estimate signal or value Theta to a velocity observer component 214, which provides a rotor velocity signal or value ω to an optional low pass filter (LPF) 216, which provides the speed feedback signal or value Spfbk to the velocity controller 200. The estimated rotor EMF angle Theta is also provided from the position observer 212 to the α, β to d, d converter component 210 in order to provide the d and q axis current feedback signals to the current controller 202.

In operation, the controller 100 computes the speed feedback value Spfbk representing a rotational speed of the motor 20 according to at least one voltage or current value associated with the power conversion system 40. As detailed below in connection with FIGS. 4-14, the voltage and/or current values can be obtained by measurement (e.g., from the output of the inverter 46, the output of the filter 30, the secondary side output of the transformer 50, etc.) and/or the observer 211 can use voltage and/or current values computed inside the controller 100 as reference values or command values. The controller 100 provides inverter switching control signals 102 to operate the switches S1-S6 of the inverter 46 to regulate the rotational speed of the motor 20 at least partially according to the inverter speed feedback value Spfbk using vector control. In this manner, sensorless control is facilitated by use of the observer 100. Moreover, the controller 100 employs one or more proportional-integral (PI) control components for velocity control (200 in FIG. 2) and current control (current controller 202 in FIG. 2) using vector control to form a multiple loop control configuration using data and instructions stored in the memory 104. In this regard, certain examples of the control configuration include an outer speed loop (e.g., sensorless speed control using observed position and/or speed) in addition to an inner torque control loop (with a torque-to-current converter component to provide a current reference signal based on a torque reference signal or value from the speed PI controller), as well as an inner current control loop. For example, speed and current PI control components 200 and 202 in the examples of FIGS. 4-14 implement vector control for closed-loop regulation within the corresponding speed and current control loops in the controller 100.

In the illustrated examples, moreover, the controller 100 computes the speed feedback value Spfbk according to the at least one voltage or current value associated with the power conversion system 40 using the observer 211 that includes impedance parameters 122 of the filter 30, the transformer 50, the motor cable 60 and the motor 20 referred to a primary side of the transformer 50. A variety of different implementations of the observer 211 can be used in different examples. In the example of FIG. 2, the controller 100 implements the position observer 212 to compute the estimated rotor EMF position value Theta, which represents the angular position of the rotor of the motor load 20 according to the voltage and/or current value(s) associated with the drive 40.

Referring also to FIG. 3, the position observer 212 includes impedance parameters 122 of the filter 30, the transformer 50, the motor cable 60 and the motor 20 referred to a primary side of the transformer 50 as seen in FIG. 3 for computing the system resistive and inductive values, computing the rotor flux values based on the system voltages/currents and computing the estimated rotor EMF angle value Theta based on the rotor flux. In certain implementations, moreover, the system impedance parameters 122 are known and programmed into the controller 100, and the equations 304 and 306 need not be computed in real time, where the controller memory 104 merely stores resistive and inductive system values for use in real time in solving the flux and position equations 302 and 300. FIG. 3 illustrates further details of the observer formulas 120 and system parameters 122 in the position or angle observer 212 of FIG. 2. In this example, the position observer 212 is implemented by the processor 102 in the controller 100 to solve an angle equation or formula 300 based on α, β rotor flux values $\lambda'_\beta$ and $\lambda'_\alpha$. The flux values $\lambda'_\beta$ and $\lambda'_\alpha$, in turn, are computed by the controller 100 according to vector equation 302 based on system resistive and inductive impedance parameters or values $R_{sys}$ and $L_{sys}$, obtained previously by equations 304 and 306, respectively according to the known system parameters 122.

In certain examples, the observer 211 includes resistance and inductance parameters 122 of the filter 30, the transformer 50, the motor cable 60 and the motor 20 referred to a primary side of the transformer 50, as well as a turns ratio parameter 122 of the transformer 50. In the example of FIG. 3, the parameter $R_{sys}$ is a system resistance of the filter 30, the transformer 50, the motor cable 60 and the motor 20 referred to the primary side of the transformer 50, where $R'_{motor}$ is a resistance of the motor 20 referred to the primary side of the transformer 50, $R'_{cable}$ is a resistance of the motor cable 60 referred to the primary side of the transformer 50, $R_{filter}$ is a resistance of the filter 30 connected to the primary side of the transformer 50, and $R'_{xfmr}$ is a resistance of the transformer 50 referred to the primary side of the transformer 50. In addition, the observer 211 in this example uses the turns ratio value Np/Ns of the transformer 50 in determining the system resistance based on referencing to the primary side of the transformer 50. Similarly, $L_{sys}$ is the inductance of the filter 30, the transformer 50, the motor cable 60 and the motor 20 referred to the primary side of the transformer 50, where $L'_{motor}$ is an inductance of the motor 20 referred to the primary side of the transformer 50, $L'_{cable}$ is motor is an inductance of the motor cable 60 referred to the primary side of the transformer 50, $L_{filter}$ is an inductance of the filter 30 connected to the primary side of the transformer 50, and $L'_{xfmr}$ is an inductance of the transformer 50 referred to the primary side of the transformer 50.

In other embodiments, the position observer 212 uses currents, voltages, resistances, and inductances referred to the secondary side of the transformer 30. In this case, the voltages, currents, and filter parameters are adjusted using the transformer ratio (Np/Ns) before being used in the observer equations 120.

Figure 4:
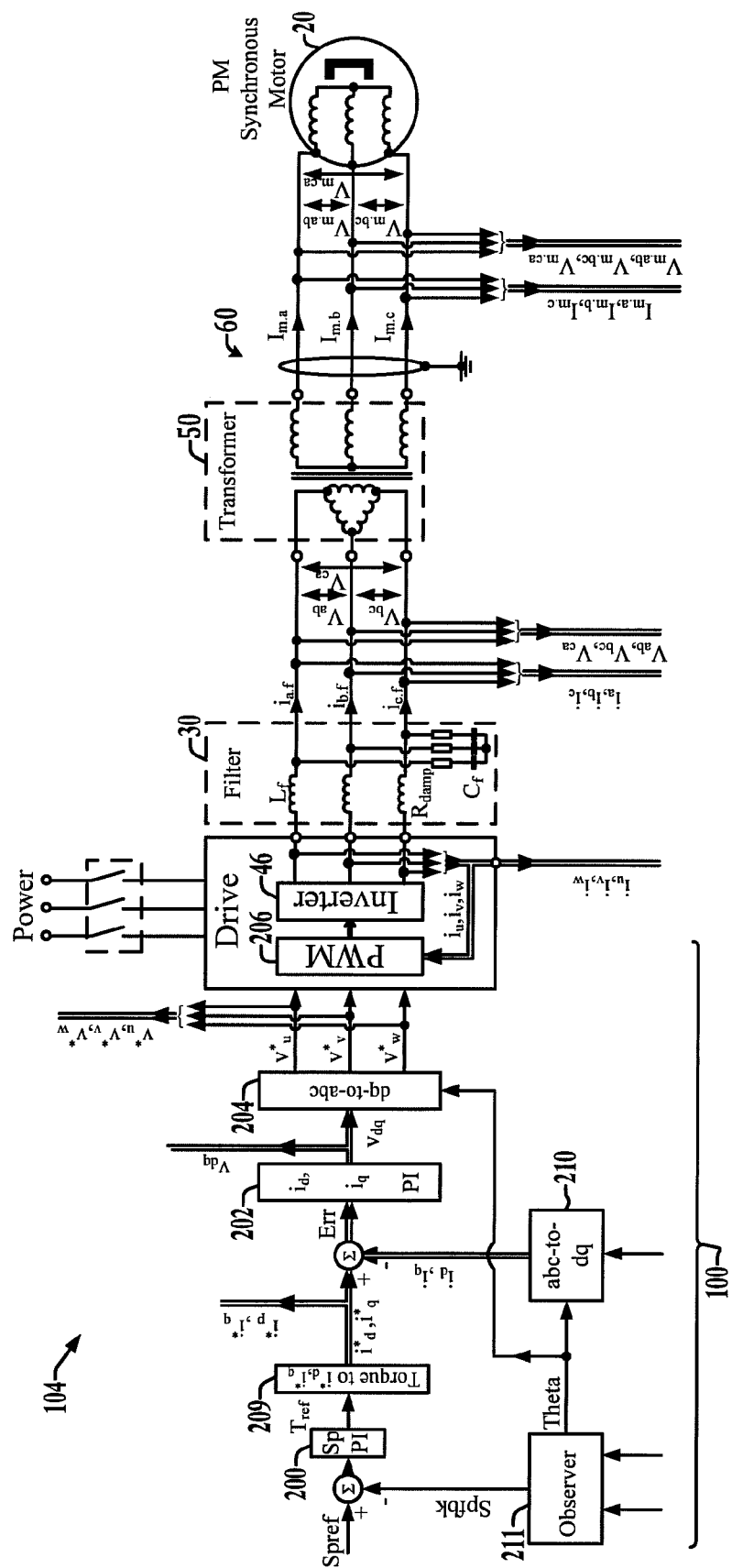
FIG. 4 is a schematic diagram showing further details of a multi-loop control scheme implemented by the drive controller and the system of FIG. 1.

FIGS. 4-14 schematically illustrate the motor drive system 40 including schematic representations of the controller components 100 implemented through data and instructions in the memory 104. As seen in FIG. 4, the observer 211 receives current and/or voltage information, and the converter component 210 receives current information. The voltage and/or current information can be derived from a number of different sources within the overall power conversion system, including measured values from the output of the inverter 46, from the output of the filter 30, from the secondary or output side of the transformer 50, and/or from sources within the controller 100 itself, such as reference or command values provided by the speed PI controller 200 (e.g., directly or after conversion from torque reference to d and q-axis current reference signals or values) and/or from the current PI controller 202.

Figure 5:
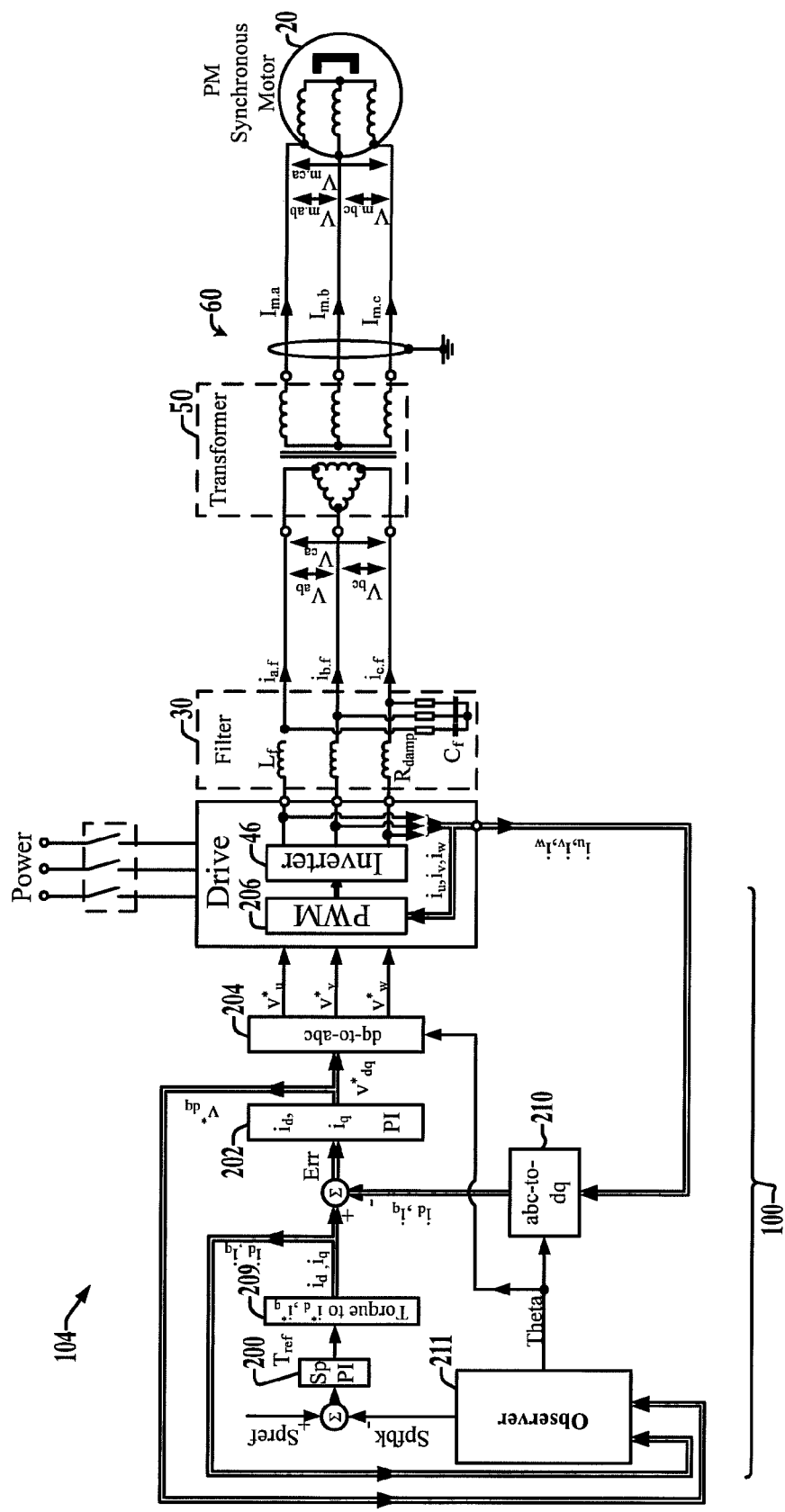
FIGS. 5-14 are schematic diagrams of different control configuration structures in the system of FIG. 1.

FIG. 5 shows one example, in which the observer 211 receives d and q axis current and signals or values from the speed PI controller 200, and receives d and q axis voltage values computed by the current PI controller 202. In this example, the speed PI controller 200 provides a torque reference value $T_{ref}$ based on an error signal according to the speed reference or setpoint value Spref and the observer speed feedback value Spfbk, and a converter component 209 converts the torque reference value is converted to d and q current references $I_{d,q\_ref}$ that are provided as inputs to the observer 211. The d and q current reference values are also used to generate a current error signal Err after subtraction of the d and q axis current feedback values $I_{d,q}$ from the converter component 210, and the current PI controller 202 generates the d and q axis voltage values $V_{d,q}$ for conversion to three-phase voltage commands $v^*_u$, $v^*_v$ and $v^*_w$ used by the PWM component 206 to generate the inverter switching control signals 102. The EMF based observer 211 uses the voltage command signals or values $V_{d,q}$ and the d and q current references $I_{d,q}$ to compete the estimated speed feedback value Spfbk for speed regulation by the speed PI controller 200, and the observer 211 also generates the angle position estimate Theta used by the converter components 204 and 210.

Figure 6:
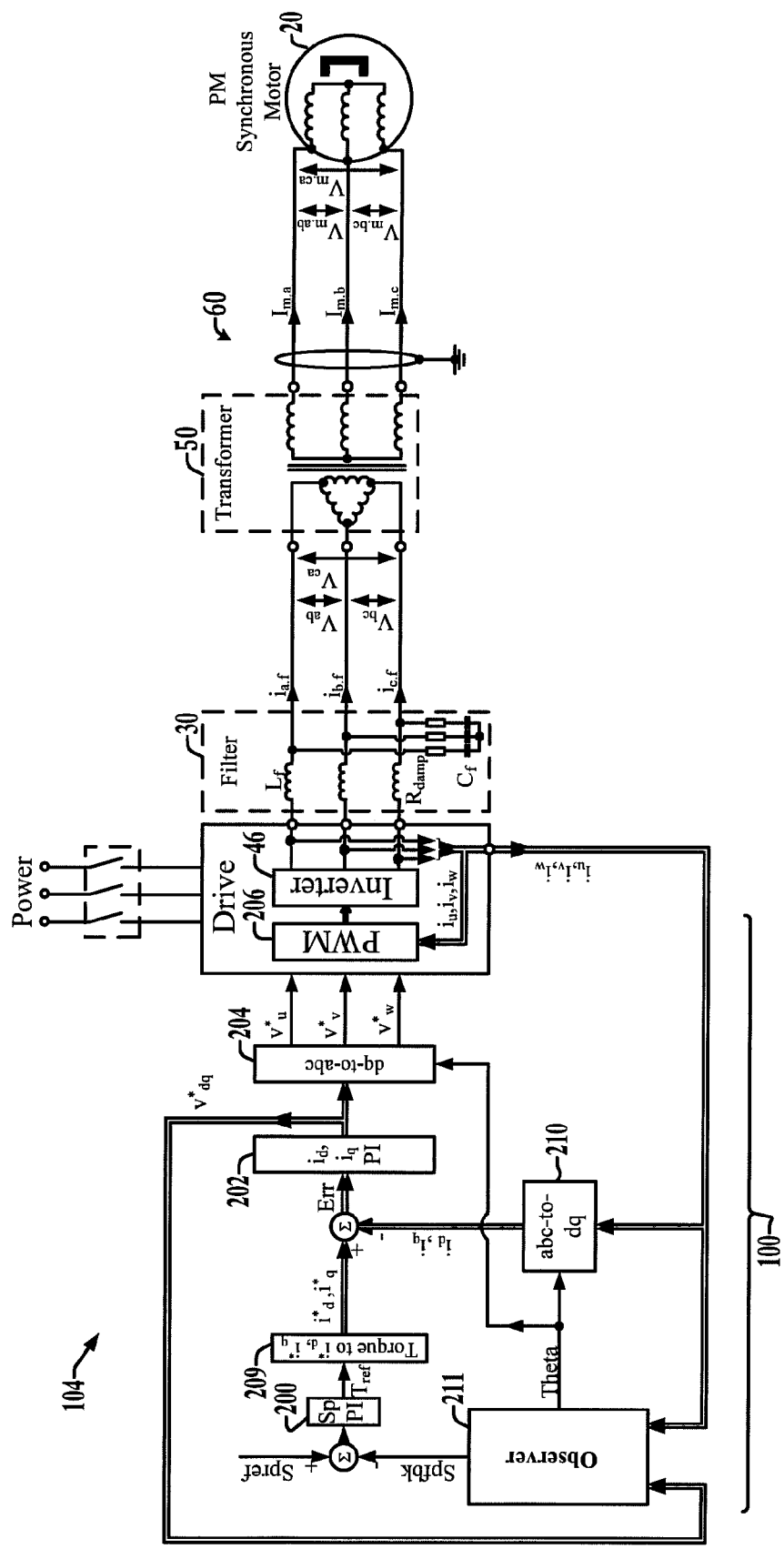
Figure 7:
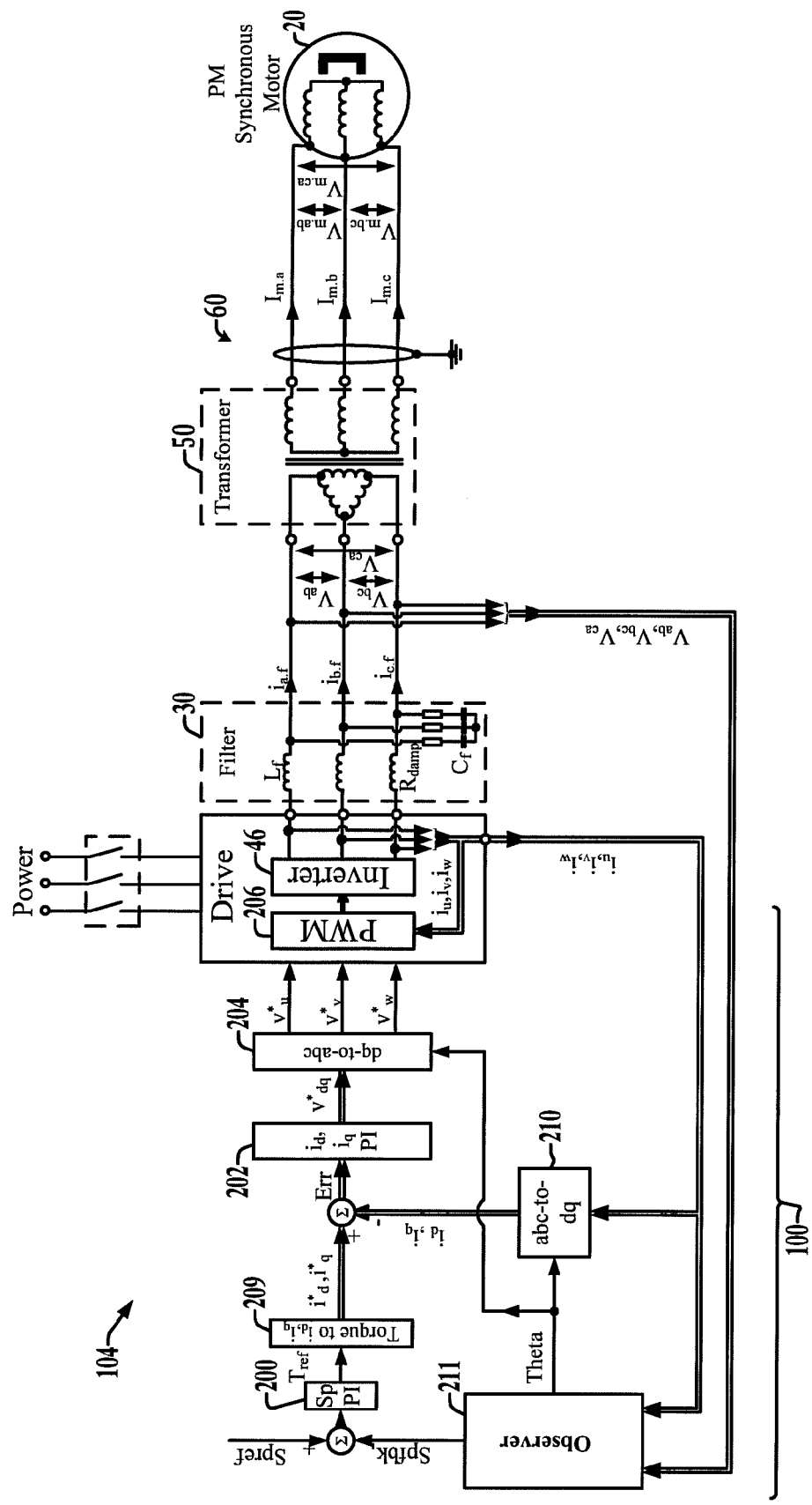
Figure 8:
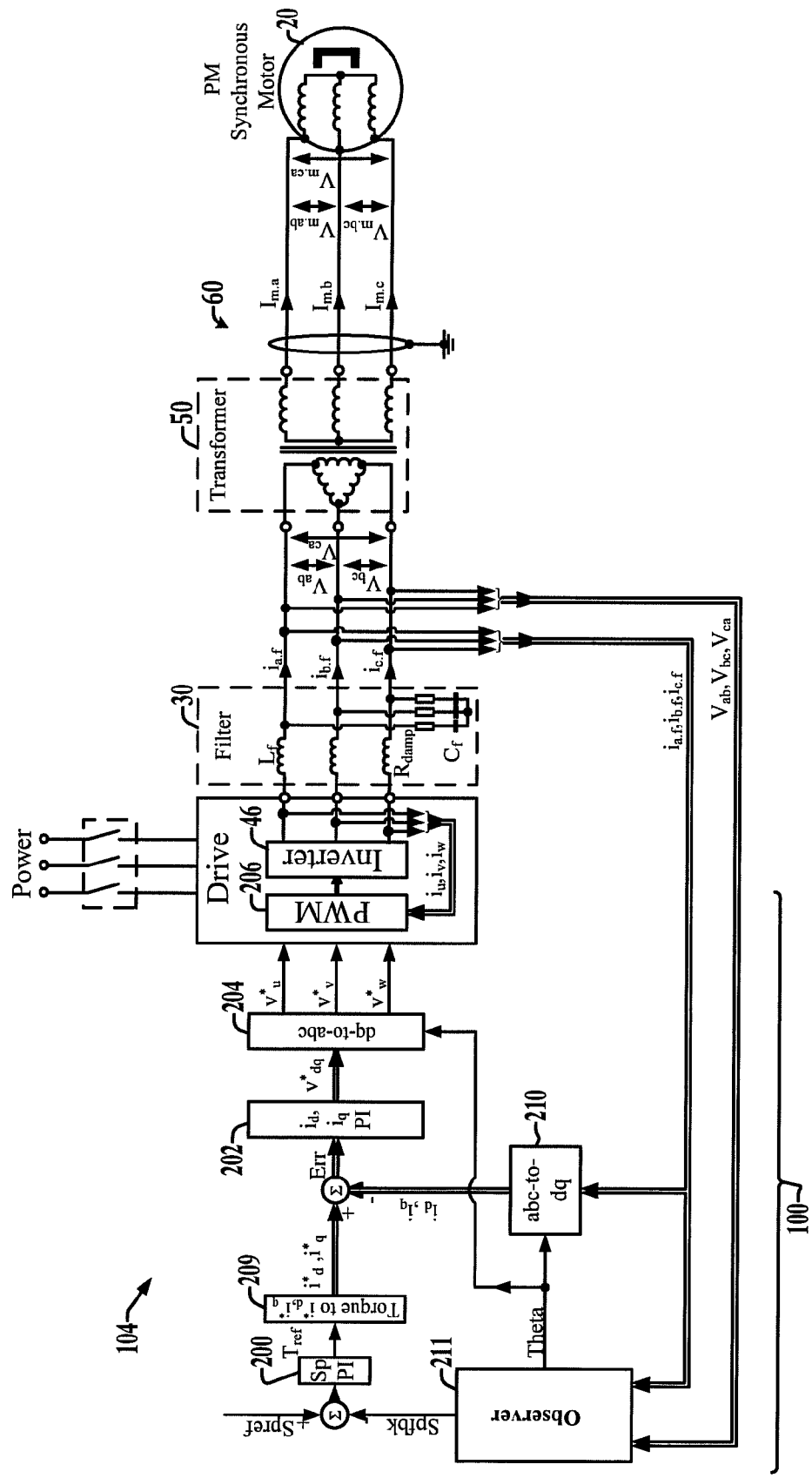

FIG. 6 illustrates another example, in which the observer 211 uses the voltage values $V_{d,q}$ generated by the current PI controller 202. In this example, the observer 211 and the converter component 210 use feedback current values $i_u$, $i_v$ and $i_w$ measured at the output of the inverter 46. FIG. 7 shows another example in which the observer 211 and the converter component 210 use feedback current values $i_u$, $i_v$, and $i_w$ measured at the output of the inverter 46, and the observer 211 uses line-line feedback voltage values $V_{ab}$, $V_{bc}$ and $V_{ca}$ measured at the output of the filter 30. Another example is shown in FIG. 8, in which the converter and observer components 210 and 211 use the current values $i_{a,f}$, $i_{b,f}$ and $i_{c,g}$ from the output of the filter 30, and the filter output voltage values $V_{ab}$, $V_{bc}$ and $V_{ca}$ are provided to the observer 211 to estimate the angle Theta and the speed feedback Spfbk.

Figure 9:
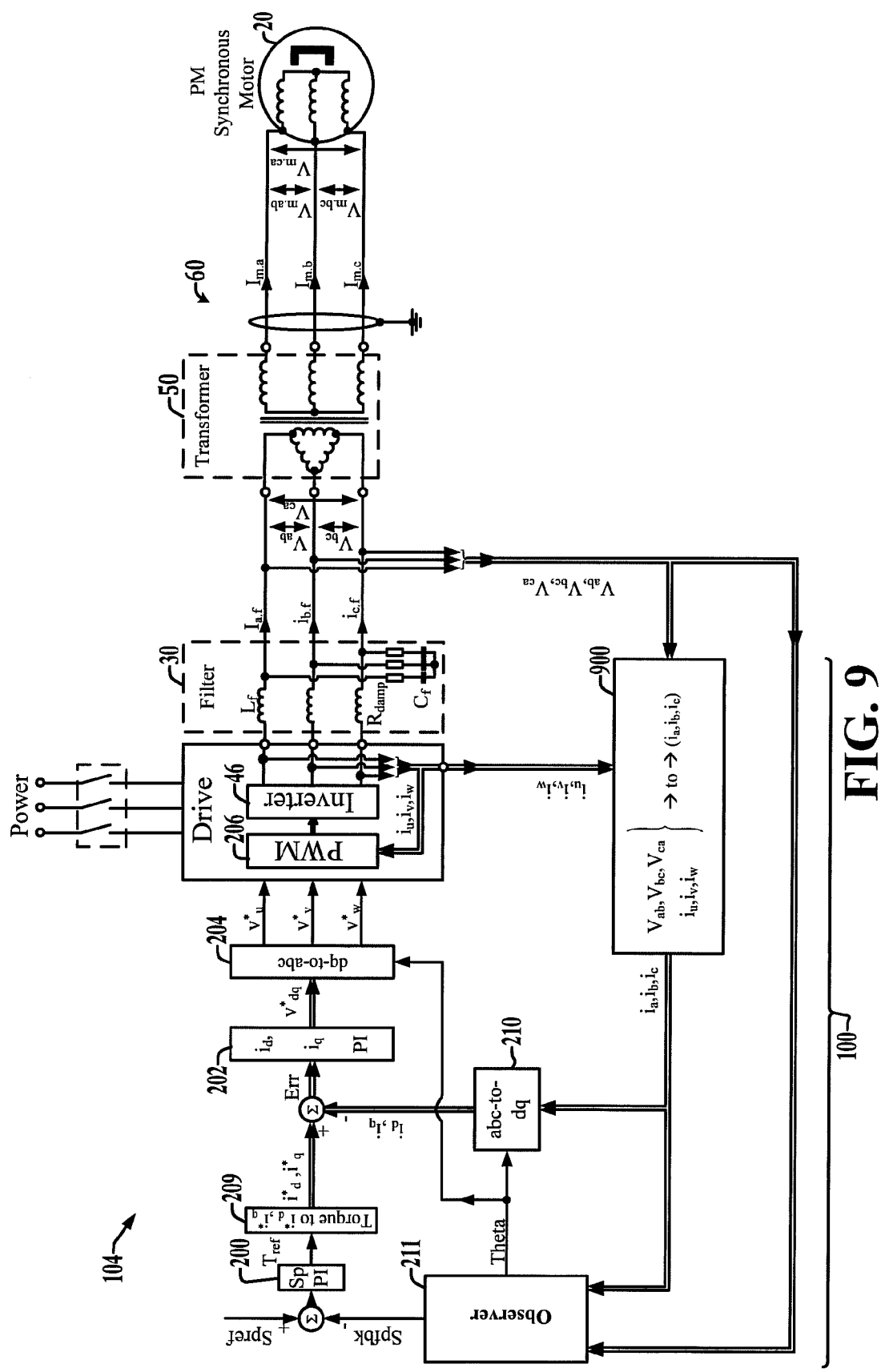
Figure 10:
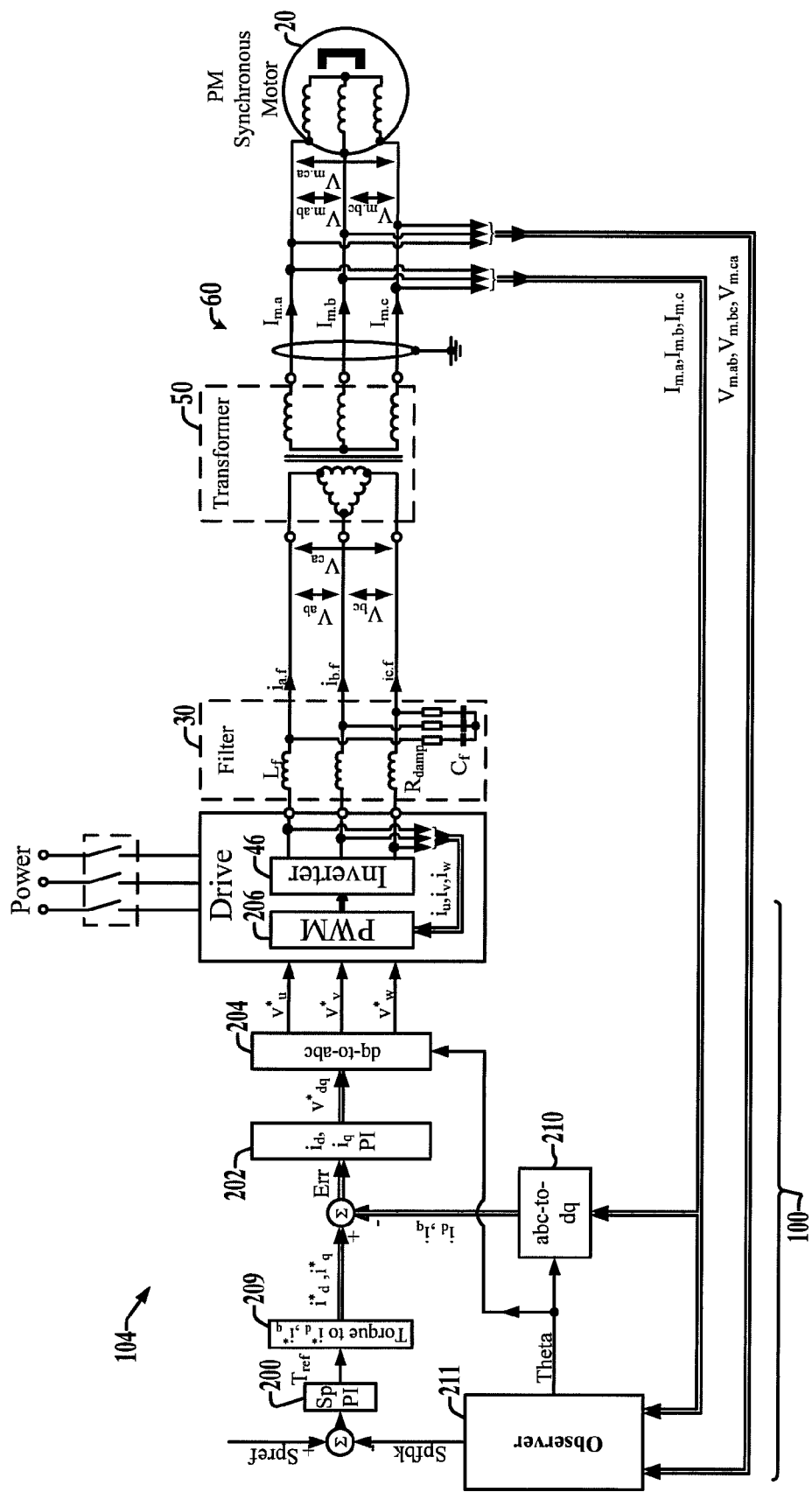

In FIG. 9, the observer 211 receives the voltage values $V_{ab}$, $V_{bc}$ and $V_{ca}$ measured at the output of the filter 30. The line-line filter output voltage values $V_{ab}$, $V_{bc}$ and $V_{ca}$ are used along with measured inverter output current values $I_u$, $I_v$ and $I_w$ by a conversion component 900 to compute estimated filter output current values $I_a$, $I_b$ and $I_c$ for use by the observer 211 and the converter component 210. FIG. 10 shows a further example where motor current values $I_{m.a}$, $I_{m.b}$ and $I_{m.c}$ and line-line motor voltage values $V_{m.ab}$, $V_{m.bc}$ and $V_{m.ca}$ are measured at the motor load 20 for use by the observer 211 and the converter component 210.

Figure 11:
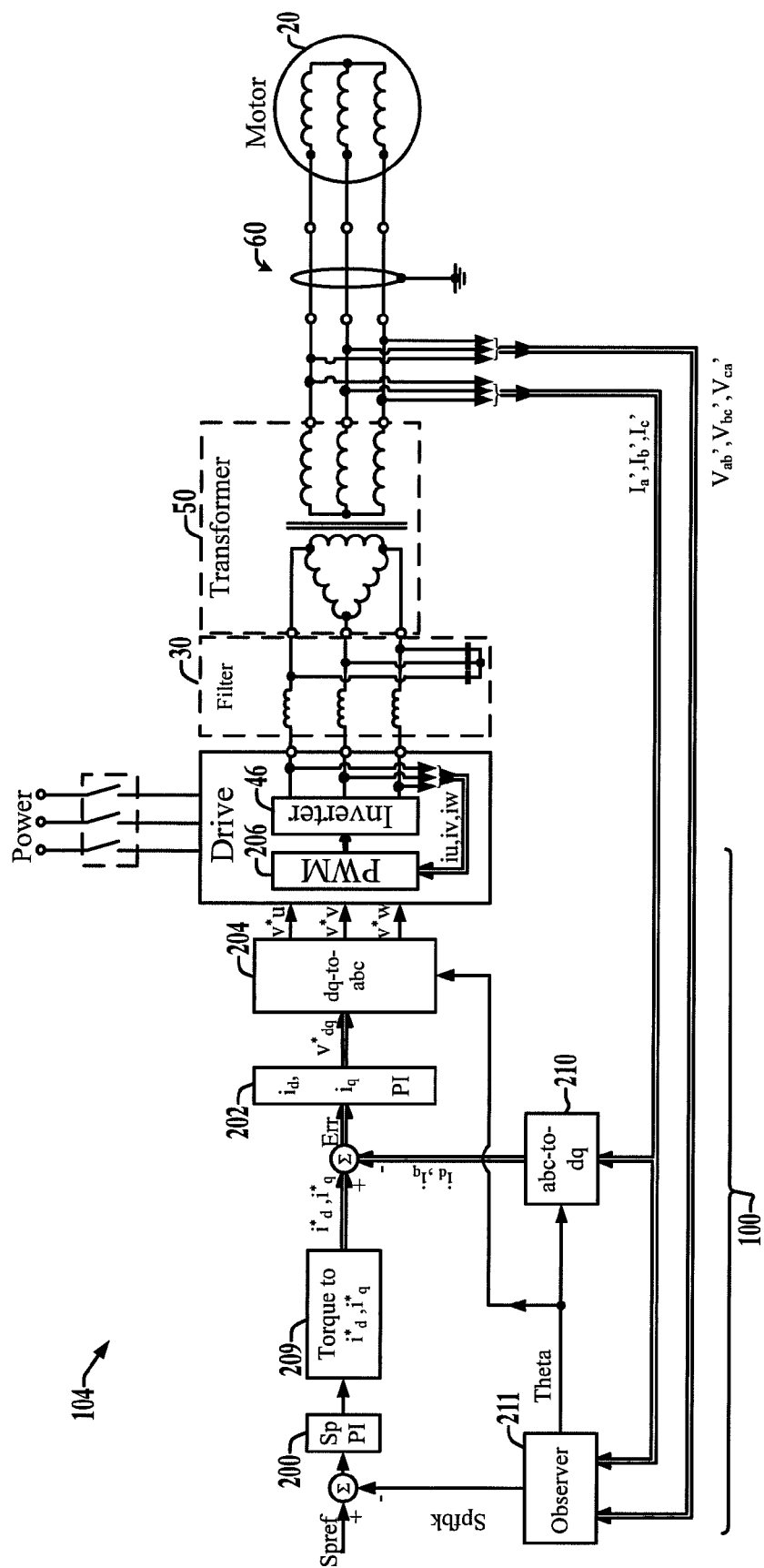
Figure 12:
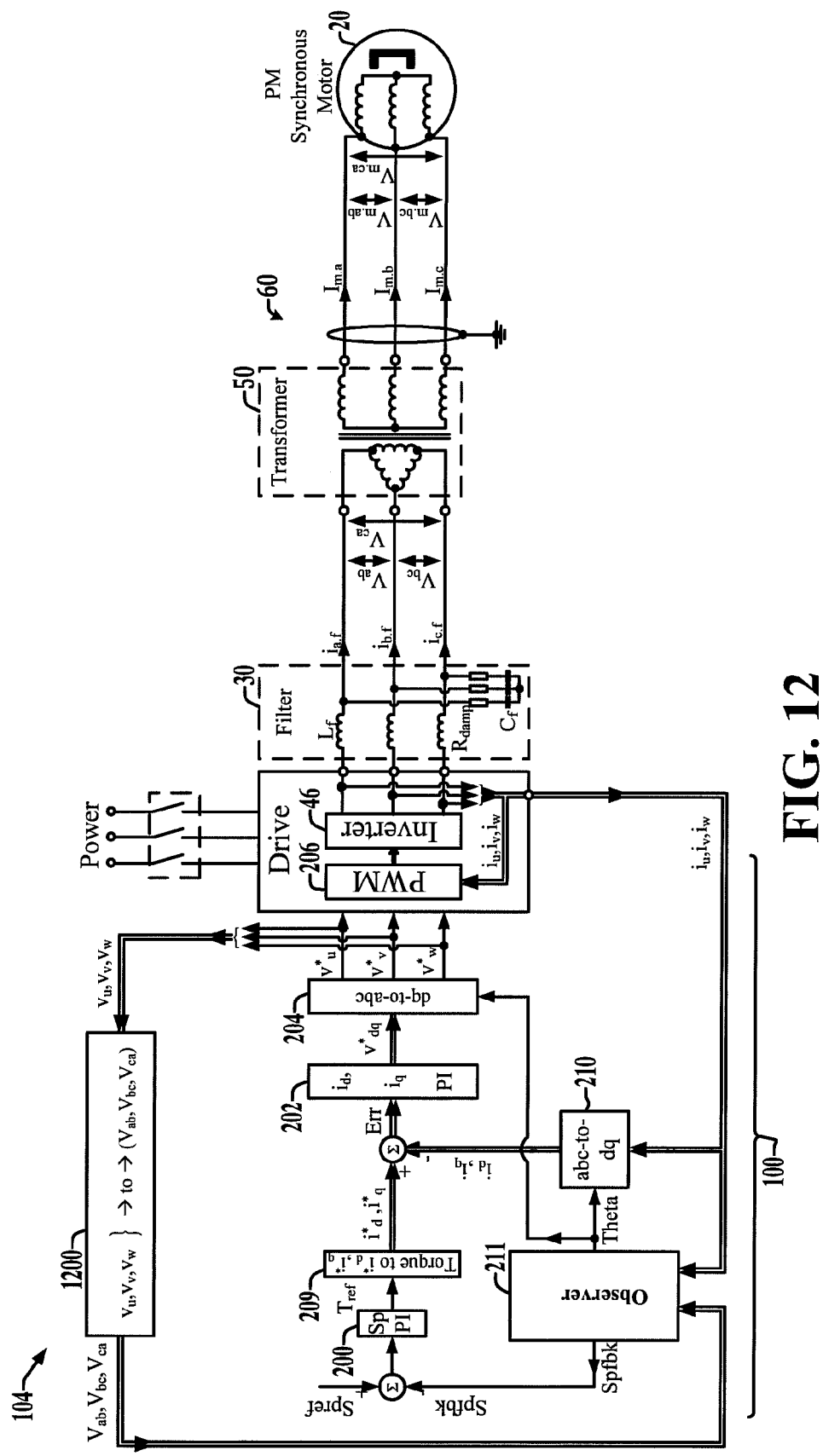
Figure 13:
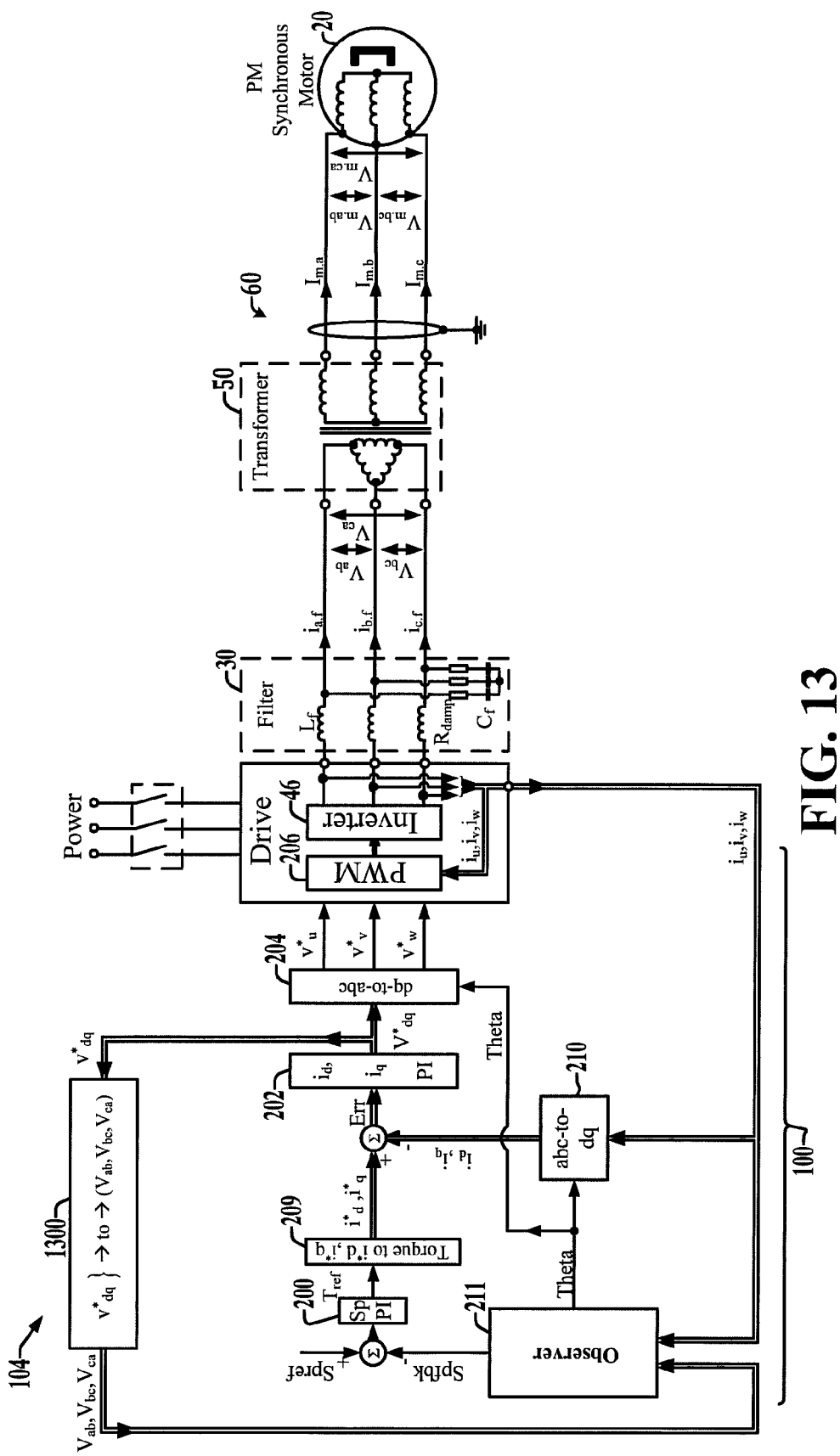
Figure 14:
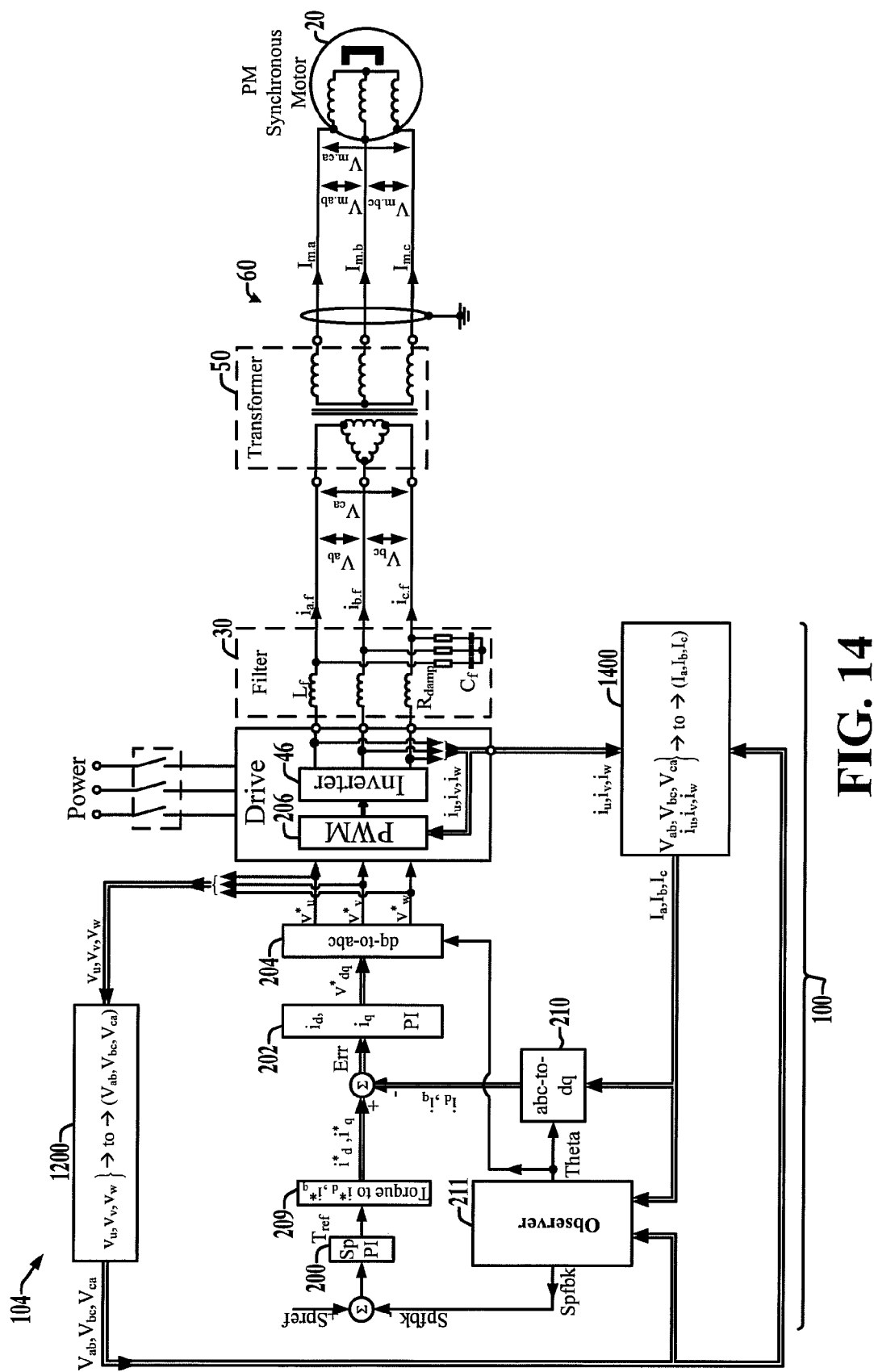

The observer 211 in the example of FIG. 11 computes Theta and Spfbk based on transformer secondary current values $I'_a$, $I'_b$ and $I'_c$ and line-line motor voltage values $V'_{ab}$, $V'_{bc}$ and $V'_{ca}$ measured at the secondary side or output of the transformer 50. In FIG. 12, the converter component 210 and the observer 211 use the measured inverter output current feedback values $i_u$, $i_v$ and $i_w$. In this example, a conversion component 1200 provides line-line estimated filter output voltage values $V_{ab}$, $V_{bc}$ and $V_{ca}$ based on conversion of the three-phase command voltage signals or values $v_u$, $v_v$ and $v_z$ from the conversion component 204, and the observer 211 uses these voltages along with the measured inverter output current feedback values $i_u$, $i_v$ and $i_w$ to generate the angle position Theta and the speed feedback value Spfbk for the speed control loop. In FIG. 13, a conversion component 1300 converts the d and q axis command voltage values $v^*_{d,q}$ to compute line-line voltage values $V_{ab}$, $V_{bc}$ and $V_{ca}$ and provides these to the observer 211. The observer 211 and the conversion component 210 in this example used the measured inverter output current values $i_u$, $i_v$ and $i_w$. In the example of FIG. 14, like FIG. 12, the conversion component 1200 provides line-line estimated filter output voltage values $V_{ab}$, $V_{bc}$ and $V_{ca}$ to the observer 211 based on conversion of the three-phase command voltage signals or values $v_u$, $v_v$ and $v_w$ from the conversion component 204. Also in FIG. 14, the converter component 210 and the observer 211 use estimated filter output current values $I_a$, $I_b$ and $I_c$ provided by a conversion component 1400 based on the estimated filter output voltage values $V_{ab}$, $V_{bc}$ and $V_{ca}$ from the component 1200, and also based on the measured inverter output current feedback values $i_u$, $i_v$ and $i_w$.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:

1. A power conversion system, comprising:
    an inverter comprising a DC input, an AC output, and a plurality of switching devices coupled between the DC input and the AC output and operative according to inverter switching control signals to convert DC electrical power received at the DC input to provide AC electrical output power at the AC output to drive a motor through an intervening filter, a transformer and a motor cable; and
    a controller configured to compute a speed feedback value representing a rotational speed of the motor according to at least one voltage or current value associated with the power conversion system, and to provide the inverter switching control signals to control the inverter to regulate the rotational speed of the motor at least partially according to the inverter speed feedback value using vector control;
    wherein the controller is configured to compute the speed feedback value according to the at least one voltage or current value associated with the power conversion system using an observer that includes impedance parameters of the filter, the transformer, the motor cable and the motor.

2. The power conversion system of claim 1, wherein the controller is configured to compute the speed feedback value by:
    computing an estimated motor position value, representing an angular position associated with the motor load according to the at least one voltage or current value associated with the power conversion system using a position observer that includes impedance parameters of the filter, the transformer, the motor cable and the motor; and computing the speed feedback value according to the estimated motor position value.

3. The power conversion system of claim 2, wherein the controller is configured to compute the estimated motor position value using the following equation:

$$\theta = \tan^{-1}\left(\frac{\lambda'_\beta}{\lambda'_\alpha}\right);$$

wherein:

$$\begin{bmatrix} \lambda'_\alpha \\ \lambda'_\beta \end{bmatrix} = \begin{bmatrix} -i_\alpha \cdot L_{sys} \\ -i_\beta \cdot L_{sys} \end{bmatrix} + \int \begin{bmatrix} v_\alpha - i_\alpha \cdot R_{sys} \\ v_\beta - i_\beta \cdot R_{sys} \end{bmatrix} \cdot dt;$$

wherein:

$$R_{sys} = R'_{motor} + R'_{cable} + R_{filter} + R'_{Xmfr} =$$
$$\left(\frac{N_p}{N_s}\right)^2 \cdot R_{motor} + \left(\frac{N_p}{N_s}\right)^2 \cdot R_{cable} + R_{filter} + \left[R_{Xmfr\_p} + \left(\frac{N_p}{N_s}\right)^2 \cdot R_{Xmfr\_s}\right];$$

wherein:

$$L_{sys} = L'_{motor} + L'_{cable} + L_{filter} + L'_{Xmfr} =$$
$$\left(\frac{N_p}{N_s}\right)^2 \cdot L_{motor} + \left(\frac{N_p}{N_s}\right)^2 \cdot L_{cable} + L_{filter} + \left[L_{Xmfr\_p} + \left(\frac{N_p}{N_s}\right)^2 \cdot L'_{Xmfr\_s}\right];$$

wherein Rsys is a resistance of the filter, the transformer, the motor cable and the motor referred to the primary side of the transformer, R' motor is a resistance of the motor referred to the primary side of the transformer, R'cable is a resistance of the motor cable referred to the primary side of the transformer, Rfilter is a resistance of the filter referred to the primary side of the transformer, R'xfmr is a resistance of the transformer referred to the primary side of the transformer, and Np/Ns is a turns ratio of the transformer; and wherein Lsys is an inductance of the filter, the transformer, the motor cable and the motor referred to the primary side of the transformer, L' motor is an inductance of the motor referred to the primary side of the transformer, L' cable is an inductance of the motor cable referred to the primary side of the transformer, Lfilter is an inductance of the filter referred to the primary side of the transformer, and L'xfmr is an inductance of the transformer referred to the primary side of the transformer.

4. The power conversion system of claim 2, wherein the observer includes resistance and inductance parameters of the filter, the transformer, the motor cable and the motor; and wherein the observer includes a turns ratio parameter of the transformer.

5. The power conversion system of claim 1, wherein the at least one voltage or current value associated with the power conversion system is measured at an output of the inverter.

6. The power conversion system of claim 1, wherein the at least one voltage or current value associated with the power conversion system is at least one of a command value and a reference value computed for a control loop used to regulate an operating parameter of the motor.

7. The power conversion system of claim 1, wherein the at least one voltage or current value associated with the power conversion system is measured at an output of the filter.

8. The power conversion system of claim 1, wherein the at least one voltage or current value associated with the power conversion system is measured at an output of the transformer.

9. The power conversion system of claim 1, wherein the controller is configured to provide the inverter switching control signals to regulate the rotational speed of the motor using vector control via a speed control loop and a current control loop.

10. A method for sensorless speed control of a motor driven by an inverter through an intervening filter, a transformer and a motor cable, the method comprising:
using at least one processor, computing a speed feedback value representing a rotational speed of the motor according to at least one voltage or current value associated with the power conversion system using an observer that includes impedance parameters of the filter, the transformer, the motor cable and the motor; and
using the at least one processor, providing inverter switching control signals to control an inverter to regulate the rotational speed of the motor at least partially according to the inverter speed feedback value using vector control.

11. The method of claim 10, wherein the at least one processor is configured to compute the speed feedback value by:
computing an estimated motor position value, representing an angular position associated with the motor load according to the at least one voltage or current value associated with the power conversion system using a position observer that includes impedance parameters of the filter, the transformer, the motor cable and the motor; and
computing the speed feedback value according to the estimated motor position value.

12. The method of claim 10, comprising measuring the at least one voltage or current value at an output of the inverter.

13. The method of claim 10, comprising: using the at least one processor, computing the at least one voltage or current value as at least one of a command value and a reference value for a control loop used to regulate an operating parameter of the motor.

14. The method of claim 10, comprising measuring the at least one voltage or current value at an output of the filter.

15. The method of claim 10, comprising measuring the at least one voltage or current value at an output of the transformer.

16. A non-transitory computer readable medium, comprising computer readable instructions which, when executed by at least one processor cause the at least one processor to implement a process including:
computing a speed feedback value representing a rotational speed of a controlled motor according to at least one voltage or current value associated with a power conversion system using an observer that includes impedance parameters of the filter, the transformer, the motor cable and the motor; and providing inverter switching control signals to control an inverter of the power conversion system to regulate the rotational speed of the controlled motor at least partially according to the inverter speed feedback value using vector control.

\* \* \* \* \*